United States Patent
Nomura

(10) Patent No.: US 9,933,281 B2
(45) Date of Patent: Apr. 3, 2018

(54) POSITION DETECTION APPARATUS

(71) Applicant: HONDA MOTOR CO., LTD., Tokyo (JP)

(72) Inventor: Yoshihiro Nomura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 79 days.

(21) Appl. No.: 15/009,110

(22) Filed: Jan. 28, 2016

(65) Prior Publication Data

US 2016/0245669 A1    Aug. 25, 2016

(30) Foreign Application Priority Data

Feb. 23, 2015  (JP) ................... 2015-032807

(51) Int. Cl.
| | |
|---|---|
| *G01D 5/14* | (2006.01) |
| *B62K 23/04* | (2006.01) |
| *F02D 9/10* | (2006.01) |
| *G01B 7/30* | (2006.01) |
| *F02D 9/02* | (2006.01) |

(52) U.S. Cl.
CPC ............ *G01D 5/145* (2013.01); *B62K 23/04* (2013.01); *F02D 9/105* (2013.01); *G01B 7/30* (2013.01); *F02D 2009/0294* (2013.01)

(58) Field of Classification Search
CPC .......... G01D 5/12–5/145; B62K 23/00–23/04; F02D 9/105; G01B 7/30
See application file for complete search history.

(56) References Cited

U.S. PATENT DOCUMENTS

| | | | | |
|---|---|---|---|---|
| 2004/0257067 A1* | 12/2004 | Mattson | ............ | F02D 9/105 324/207.2 |
| 2011/0080162 A1* | 4/2011 | Steinich | ............ | G01B 7/30 324/207.25 |
| 2012/0105057 A1* | 5/2012 | Mol | ............ | G01D 5/145 324/251 |
| 2013/0255432 A1* | 10/2013 | Nomura | ............ | G05G 1/10 74/504 |
| 2013/0257416 A1* | 10/2013 | Nomura | ............ | G01B 7/30 324/207.13 |
| 2014/0103916 A1* | 4/2014 | Nomura | ............ | B62K 23/04 324/207.25 |
| 2014/0130633 A1* | 5/2014 | Kumamoto | ............ | G01B 7/30 74/513 |
| 2015/0142376 A1* | 5/2015 | Ausserlechner | ....... | G01D 5/145 702/151 |
| 2016/0238410 A1* | 8/2016 | Steinich | ............ | G01D 5/145 |

FOREIGN PATENT DOCUMENTS

JP    2013-205141    10/2013

* cited by examiner

*Primary Examiner* — Huy Q Phan
*Assistant Examiner* — David Frederiksen
(74) *Attorney, Agent, or Firm* — Rankin, Hill & Clark LLP

(57) ABSTRACT

A Halbach array is formed from first to third magnets provided to a rotor. Of shortest straight-line distances (clearance distances) between the first to third magnets and a Hall element as facing the first to third magnets after moving relative to the first to third magnets, the shortest straight-line distance between the second magnet and the Hall element is set the longest. In other words, the second magnet is placed at a position offset from the first magnet. In addition, the second magnet may be offset from the third magnet.

15 Claims, 7 Drawing Sheets

POSITION DETECTION APPARATUS

BACKGROUND OF THE INVENTION

Field of the Invention

The present invention relates to a position detection apparatus configured to detect a position of a movement body.

Description of Related Art

In a motorcycle, an accelerator grip is attached to a handlebar. A throttle valve provided to an internal combustion engine is operated to open and close as a driver turns the accelerator grip in the circumferential direction of the accelerator grip.

The opening and closing operation of the throttle valve needs to be controlled such that an amount of opening and closing of the throttle valve corresponds to an amount of turn (an amount of movement from an initial position) of the accelerator grip. Against this background, as a throttle opening detection apparatus, a position detection apparatus configured to detect the position of the accelerator grip is provided to the handlebar.

The position detection apparatus includes a rotor that rotates in conjunction with manipulation of the accelerator grip. As shown in FIGS. 2 and 4 of Japanese Patent Application Publication No. 2013-205141, the rotor is provided with multiple magnets. Thus, the multiple magnets change their positions while following the rotation of the rotor.

The position detection apparatus further includes a magnetic sensor formed from a Hall element or the like. The magnetic sensor, for example, detects directions (vectors) of magnetic fluxes of the magnets changing their positions, and outputs an electric signal corresponding to the vectors. Based on the electric signal, an amount of rotation (an angle of rotation) of the rotor, and accordingly the position of the accelerator grip are obtained.

It should be noted that an array of the three magnets shown in FIG. 4 of Japanese Patent Application Publication No. 2013-205141 is referred to as a Halbach array. In this case, magnetic fluxes concentrate on a side of the Halbach array, which faces the magnetic sensor, and the concentration accordingly increases magnetic force.

SUMMARY OF THE INVENTION

The present invention has been made in relation to the technique described in Japanese Patent Application Publication No. 2013-205141. An object of the present invention is to provide a position detection apparatus that exerts a much better linear responsiveness to a position.

For the purpose of solving the above-mentioned problems, the present invention provides a position detection apparatus configured to judge a position of a movement body using a magnetic sensor for detecting a vector of a magnetic flux, in which:

the movement body is provided with at least a first magnet, a second magnet and a third magnet, the first to third magnets arranged in a Halbach array in which a magnetic flux of the first magnet is directed to the magnetic sensor, a magnetic flux of the second magnet is directed to the first magnet, and the third magnet receives a magnetic flux directed from the magnetic sensor to the third magnet, and a clearance distance between the second magnet and the magnetic sensor is set greater than a clearance distance between the first magnet and the magnetic sensor.

It should be noted that the clearance distance referred to herein is the shortest straight-line distance between a magnet and the magnetic sensor as facing the magnet after moving relative to the magnet.

According to the conventional Halbach array, the first to third magnets would be arranged on the same straight line. In other words, the clearance distances between the magnets and the magnetic sensor would be equal to one another. In contrast to this, in the present invention, the clearance distance between the second magnet and the magnetic sensor is greater than the clearance distance between the first magnet and the magnetic sensor. In other words, the second magnet is disposed offset from the first magnet.

For this reason, the north pole of the second magnet becomes farther from the north pole of the first magnet, and closer to the south pole of the first magnet. This resultantly makes the magnetic flux of the second magnet less likely to reach a space between the first magnet and the magnetic sensor. This accordingly makes it easy for a vector of the magnetic flux of the first magnet to change and be directed to a space between the second magnet and the magnetic sensor. For these reasons, the magnet sensor is able to recognize a change in an angle of the magnetic flux vector precisely.

It is preferable that the clearance distance between the first magnet and the magnetic sensor, and a clearance distance between the third magnet and the magnetic sensor are set equal to each other.

In this configuration, the south pole of the second magnet becomes farther from the south pole of the third magnet, and closer to the north pole of the third magnet. This resultantly makes the magnetic flux of the second magnet less likely to reach a space between the magnetic sensor and the third magnet. This accordingly makes it easy for a vector of the magnetic flux from the magnetic sensor to be directed to the third magnet. For these reasons, the magnetic sensor is capable of recognizing the change in the angle of the magnetic flux vector more precisely.

In addition, because a width from the first magnet to the third magnet can be reduced, a reduction of the size of the position detection apparatus can be achieved as well.

It is preferable that a value obtained by subtracting the clearance distance between the first magnet and the magnetic sensor from the clearance distance between the second magnet and the magnetic sensor is equal to or greater than a third of a dimension of the first magnet in a magnetic pole direction thereof. This is because this setting makes the magnetic flux of the second magnet much less likely to reach the space between the first magnet and the magnetic sensor.

If the amount of offset of the second magnet is excessively large, magnetic force is less likely to work between the second magnet and the first magnet. For this reason, it is preferable that the value obtained by subtracting the clearance distance between the first magnet and the magnetic sensor from the clearance distance between the second magnet and the magnetic sensor is equal to or less than a half of the dimension of the first magnet (28a) in the magnetic pole direction thereof.

It is preferable that the first magnet, the second magnet and the third magnet are each shaped like a rectangle in a plan view, and are provided to the movement body such that a longitudinal direction of the Halbach array is along a direction of movement of the movement body. Since the first magnet (28a) to the third magnet are formed in the same shape, a reduction in manufacturing costs can be achieved.

Furthermore, in this case, the foregoing effect can be fully obtained even if the amount of offset of the second magnet is small.

A suitable example of the movement body mentioned above is an accelerator grip turnably provided to a handle of a motorcycle. In this case, the magnetic sensor may be positioned and fixed to the handle.

In this configuration, it is preferable that the second magnet is farther from the magnetic sensor in an axial direction of the handle than the first magnet is. Thereby, it is possible to avoid an increase in the size of the handle in its radial direction.

According to the present invention, the Halbach array is configured by offsetting the second magnet, whose magnetic flux starts toward the first magnet, from the first magnet whose magnetic flux starts toward the magnetic sensor. In other words, the north pole of the second magnet becomes farther from the north pole of the first magnet, and closer to the south pole of the first magnet.

This makes the magnetic flux of the second magnet less likely to reach the space between the first magnet and the magnetic sensor. This accordingly makes it easy for the vector of the magnetic flux of the first magnet to change and be directed to the space between the second magnet and the magnetic sensor. For these reasons, the magnetic sensor is capable of recognizing a change in the angle of the magnetic flux vector precisely. This resultantly enhances linearity of the response of the magnetic sensor to the change in the angle of the magnetic flux vector.

BRIEF DESCRIPTION OF THE DRAWINGS

These and further features of the invention will be apparent with reference to the following description and drawings, wherein.

DETAILED DESCRIPTION OF THE INVENTION

Figure 1:
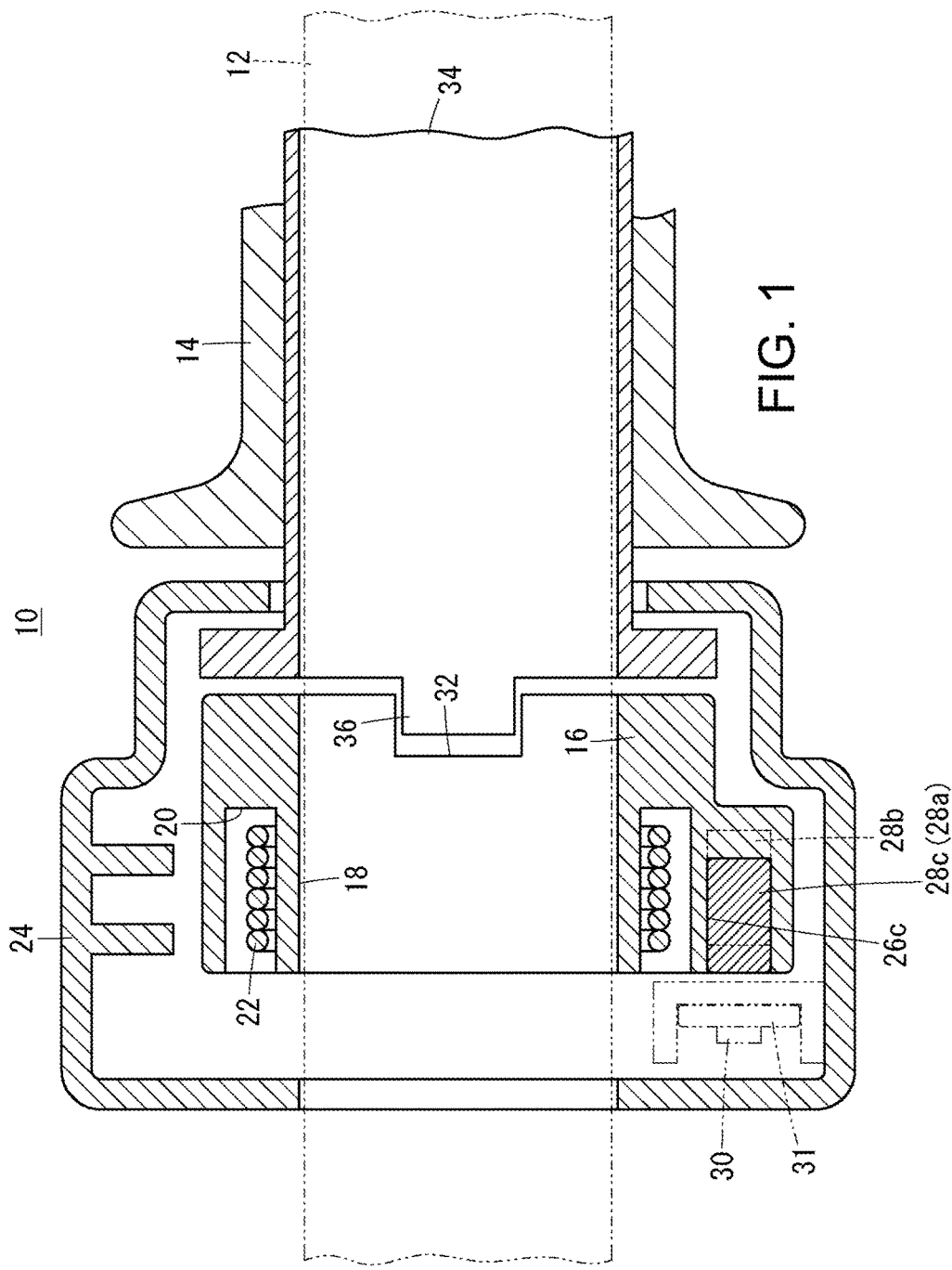
FIG. 1 is a schematic longitudinal sectional view of a position detection apparatus of an embodiment of the present invention.

FIG. 1 is a schematic longitudinal sectional view of a position detection apparatus 10 of an embodiment of the present invention. The position detection apparatus 10 is attached to a handlebar 12 (a handle), and forms a throttle opening detection apparatus configured to judge an amount of turn (a position) of an accelerator grip 14 on the basis of an amount of rotation (a rotation angle) at which a rotor 16 rotates in response to the turn of the accelerator grip 14 manipulated by a driver.

An insertion hole 18 is penetratingly formed in the rotor 16. The handlebar 12 penetrates through the insertion hole 18. A predetermined clearance is formed between an inner wall of the insertion hole 18 and the handlebar 12. This enables the rotor 16 to rotate in a circumferential direction of the handlebar 12.

A housing groove 20 extending in an axial direction of the rotor 16 (in the left-right direction in FIG. 1) is formed in the rotor 16. A return spring 22 is housed in the housing groove 20. Albeit not illustrated, one end of the return spring 22 is locked in the rotor 16, and the other end of the return spring 22 is locked in a housing 24.

Figure 2:
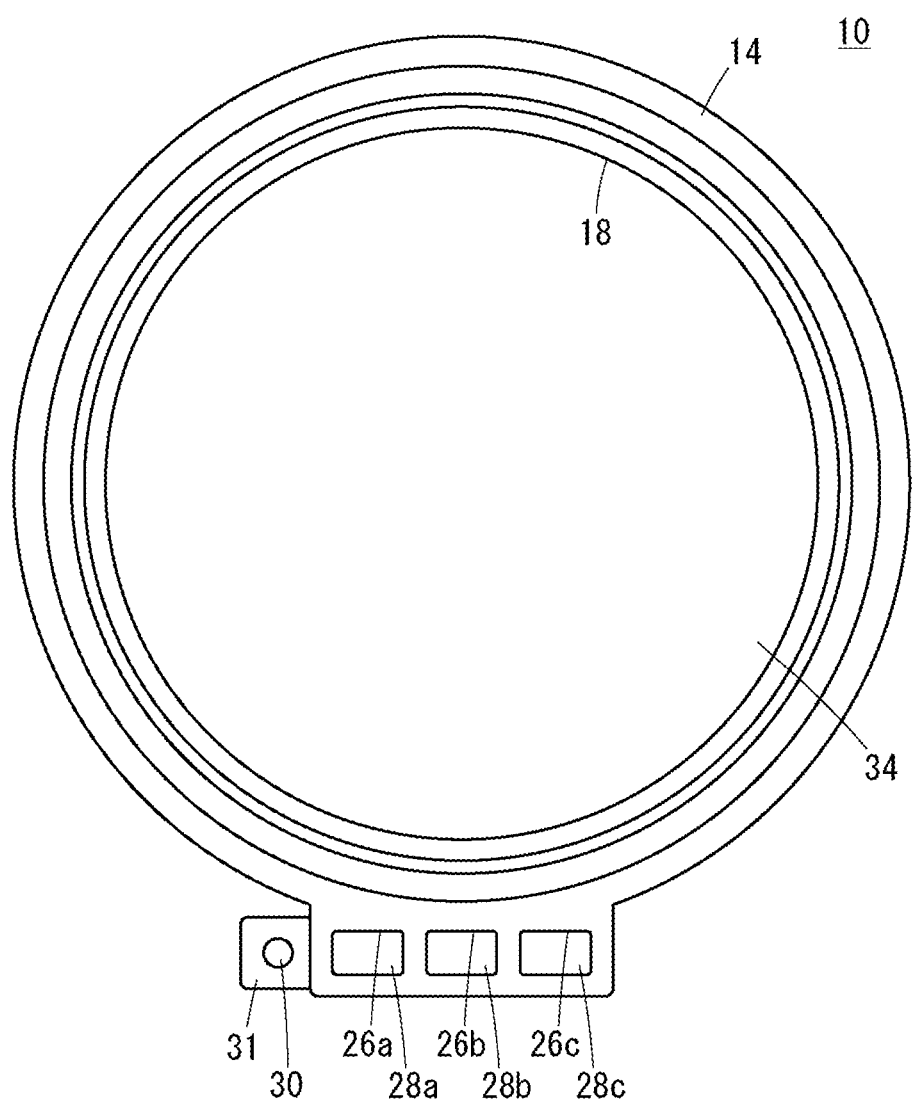
FIG. 2 is a schematic front view of the position detection apparatus of FIG. 1.

Part of the rotor 16 bulges outwards in a radial direction of the rotor 16. As shown in FIGS. 1 and 2, a first fitting recessed portion 26a, a second fitting recessed portion 26b and a third fitting recessed portion 26c are formed in the bulging part of the rotor 16 such that the first, second and third fitting recessed portions 26a, 26b, 26c are arranged side-by-side, and extend in an axial direction of the accelerator grip 14. A first magnet 28a, a second magnet 28b and a third magnet 28c are fitted in the first fitting recessed portion 26a, the second fitting recessed portion 26b and the third fitting recessed portion 26c, respectively.

Figure 3:
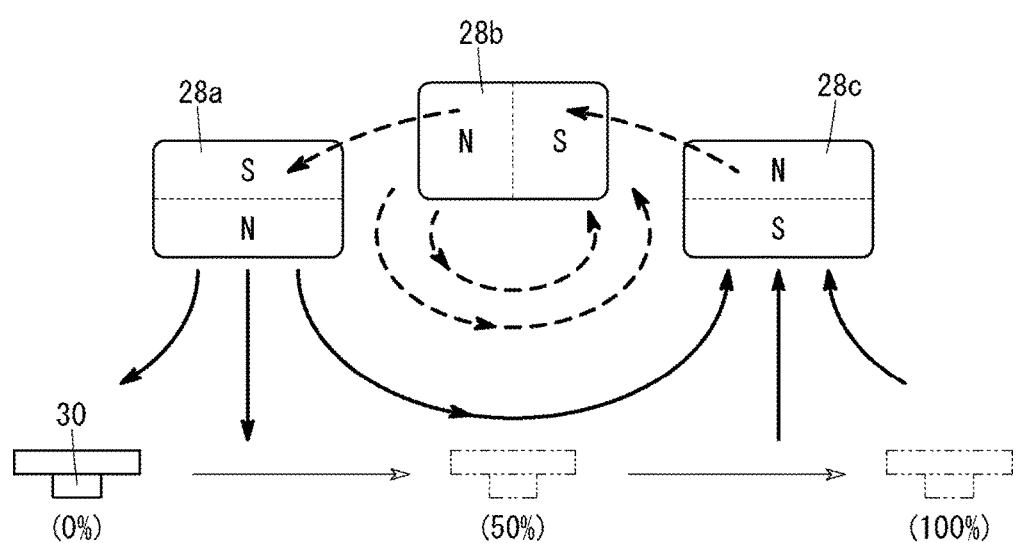
FIG. 3 is a plan view in an axial direction of an accelerator grip, which shows magnetic fluxes of first to third magnets forming the position detection apparatus of FIG. 1.

The second fitting recessed portion 26b is deeper than the first fitting recessed portion 26a and the third fitting recessed portion 26c. For this reason, as shown in FIGS. 1 and 3, the second magnet 28b is offset closer to the accelerator grip 14 than the first and third magnets 28a, 26c are. To put it specifically, if a usual Halbach array were applied to the first, second and third magnets 28a, 28b, 28c, the three magnets 28a, 28b, 28c would be arranged on the same axis; and in contrast, the array of the embodiment is an arrangement where the second magnet 28b is placed at a position offset from the first and third magnets 28a, 28c. Thereby, the north pole of the second magnet 28b becomes farther from the north pole of the first magnet 28a, and closer to the south pole of the first magnet 28a.

As learned from FIG. 3, the north pole of the first magnet 28a faces a Hall element 30, while the south pole of the first magnet 28a faces the accelerator grip 14. Meanwhile, the south pole of the third magnet 28c faces the Hall element 30, while the north pole of the third magnet 28c faces the accelerator grip 14. In other words, the magnetic pole directions of the respective first and third magnets 28a, 28c are in parallel to the axial direction of the accelerator grip 14.

On the other hand, the north pole of the second magnet 28b faces the first magnet 28a, while the south pole of the second magnet 28b faces the third magnet 28c. In other words, the magnetic pole direction of the second magnet 28b is orthogonal to the axial direction of the accelerator grip 14. Thereby, a Halbach array is formed from the first, second and third magnets 28a, 28b, 28c. The foregoing magnetic pole arrangement causes a magnetic flux directed from the first magnet 28a to the Hall element 30, a magnetic flux directed from the second magnet 28b to the first magnet 28a, and a magnetic flux directed from the Hall element 30 to the third magnet 28c.

The first, second and third magnets 28a, 28b, 28c are each shaped like a thin flat plate. In other words, in a plan view, the first, second and third magnets 28a, 28b, 28c are each shaped like a rectangle.

A dimension L1 of the first magnet 28a in its magnetic pole direction, a dimension L2 of the second magnet 28b in a direction orthogonal to its magnetic pole direction, and a dimension L3 of the third magnet 28c in its magnetic pole direction are almost equal to one another. When D1 denotes a shortest straight-line distance (clearance distance) between the first magnet 28a and the Hall element 30 as facing the first magnet 28a after moving relative to these magnets, D2 denotes a shortest straight-line distance (clearance distance) between the second magnet 28b and the Hall element 30 as facing the second magnet 28b, and D3 denotes a shortest straight-line distance (clearance distance) between the third magnet 28c and the Hall element 30 as facing the third magnet 28c, a comparison among D1, D2 and D3 shows that D1=D3 and D1<D2 (D3<D2) are satisfied. This is because as described above, the second magnet 28b is placed at the position offset from the first and third magnets 28a, 28c.

An offset amount OV of the second magnet 28b is equal to a value obtained by subtracting the clearance distance D1 (or D3) between the first magnet 28a (or the third magnet 28c) and the Hall element 30 from the clearance distance D2 between the second magnet 28b and the Hall element 30. In other words, D2−D1=D2−D1=OV is satisfied.

It is desirable that the offset amount OV be equal to or greater than a third of the dimension L1 of the first magnet 28a in its magnetic pole direction (or the dimension L3 of the third magnet 28c in its magnetic pole direction). If the offset amount OV is less than that, there may be a case, for example, where a vector of a magnetic flux starting at the second magnet 28b intersects a vector of a magnetic flux starting at the first magnet 28a, or a vector of a magnetic flux directed to the third magnet 28c. In this case, because the magnetic fluxes cancel each other, there is a concern that linear responsiveness of the Hall element 30 to the movement of the first to third magnets 28a to 28c may decrease.

It should be noted that if the offset amount OV is excessively large, magnetic force is less likely to work between the first magnet 28a and the second magnet 28b, as well as between the third magnet 28c and the second magnet 28b. Furthermore, in this case, the second fitting recessed portion 26b need to be formed deeper, the dimension of the position detection apparatus 10 in the axial direction of the accelerator grip 14 becomes greater. To avoid this, it is desirable that the offset amount OV be equal or less than a half of the dimension L1 of the first magnet 28a in its magnetic pole direction (or the dimension L3 of the third magnet 28c in its magnetic pole direction).

The first fitting recessed portion 26a and the second fitting recessed portion 26b, as well as the second fitting recessed portion 26b and the third fitting recessed portion 26c may be in close contact with each other. However, the corresponding magnets may be slightly apart from each other while the actions of their magnetic force are kept.

Magnetic flux vectors of magnetic fields produced by the first to third magnets 28a to 28c are detected by the Hall element 30 as a magnetic sensor. The Hall element 30 outputs an electric signal corresponding to a direction of a vector of a magnetic flux detected by the Hall element 30, and sends the electric signal to an electronic control unit (ECU or the like), albeit not illustrated.

As shown in FIGS. 1 and 2, the Hall element 30 is supported by a base plate 31, and is placed at a position near a bottom surface of the rotor 16 to which the first magnet 28a is provided. In other words, the Hall element 30 is provided at an opposite position across the rotor 16 from the accelerator grip 14 such that the Hall element 30 is located closer to the first magnet 28a.

The rotor 16 and the Hall element 30 are housed in the housing 24. Thereby, the rotor 16 and the Hall element 30 are protected.

An engagement recessed portion 32 is hollowly formed in a right end portion of the rotor 16, as shown in FIG. 1. On the other hand, an engagement protrusion 36 is projectingly formed on a left end portion of a throttle pipe 34 to whose outer periphery the accelerator grip 14 is fitted, as shown in FIG. 1. The engagement protrusion 36 engages with the engagement recessed portion 32. For this reason, when the throttle pipe 34 turns in response to the turn of the accelerator grip 14, the engagement protrusion 36 pushes an inner wall of the engagement recessed portion 32. As a result, the rotor 16 rotates.

Basically, the position detection apparatus 10 of the embodiment is configured as described above. Next, descriptions will be provided for operation/working-effect of the position detection apparatus 10.

As described above, in the position detection apparatus 10, the second magnet 28b is offset in the axial direction of the rotor 16. In other words, the second magnet 28b need not be offset in the radial direction of the rotor 16. Accordingly, a dimension of the housing 24 in the radial direction of the rotor 16 can be reduced. As a result, a reduction in the size of the position detection apparatus 10 is achieved.

In addition, the clearance distance D1 between the first magnet 28a and the Hall element 30 and the clearance distance D3 between the third magnet 28c and the Hall element 30 are set equal to each other. For this reason, the depth of the third fitting recessed portion 26c need not be increased. This also contributes to the reduction in the size of the position detection apparatus 10.

Furthermore, the first to third magnets 28a to 28c are each shaped like a rectangle, and have the same shape. For this reason, costs of manufacturing the first to third magnets 28a to 28c can be reduced. Incidentally, the first to third magnets 28a to 28c are each formed by applying predetermined magnetization to a rectangular ferromagnetic material to set the magnetic pole direction as described above.

In an initial state where the rotor 16 does not rotate, the Hall element 30 is located closer to the first magnet 28a as shown in FIGS. 2 and 3. This initial position is defined as 0%; a position where the Hall element 30 arrives at a midpoint of the second magnet 28b in its magnetic pole direction is defined as 50%; and a position where the Hall element 30 arrives at an end point beyond the third magnet 28c is defined as 100%.

The first to third magnets 28a to 28c in the Halbach array produces their magnetic fields, in each of which magnetic force lines (magnetic flux) are oriented as shown in FIG. 3. In other words, the magnetic flux of the first magnet 28a is directed to the Hall element 30, and the magnetic flux of the second magnet 28b is directed to the first magnet 28a. Meanwhile, the third magnet 28c receives the magnetic flux directed from the Hall element 30 to the third magnet 28c.

Once the driver turns the accelerator grip 14 attached to the tip end of the handlebar 12 of the motorcycle in the circumferential direction of the accelerator grip 14, the throttle pipe 34 turns in response to the turn of the accelerator grip 14. As a result, the engagement protrusion 36 formed on the throttle pipe 34 pushes the inner wall of the engagement recessed portion 32 formed in the rotor 16. Thereby, the rotor 16 starts to rotate. The rotation of the rotor 16 pulls and stretches the return spring 22.

This rotation changes the positions of the first to third magnets 28a to 28c provided to the rotor 16. Thus, the Hall element 30 moves relative to the first to third magnets 28a to 28c. The direction of the relative movement of the Hall element 30 is from the first magnet 28a side to the third magnet 28c side.

As the positions of the first to third magnets 28a to 28c relative to the Hall element 30 change, vectors of the magnetic fluxes directed to the Hall element 30 change. The Hall element 30 sends the electric signal to the ECU or the like while making the output level of the electric signal corresponding to the change in the vectors.

The Halbach array provided with the offset as shown in FIG. 3 makes the magnetic flux of the second magnet 28*b* less likely to reach a space between the first magnet 28*a* and the Hall element 30. This makes it easy for the vector of the magnetic flux of the first magnet 28*a* to change and be directed to a space between the second magnet 28*b* and the Hall element 30. Meanwhile, the forgoing Halbach array also makes the magnetic flux of the second magnet 28*b* less likely to reach a space between the Hall element 30 and the third magnet 28*c*. This makes it easy for the vector of the magnetic flux directed to the third magnet 28*c* to change. For these reasons, the Hall element 30 is able to recognize a change in the angle of the magnetic flux vector precisely.

Figure 4:
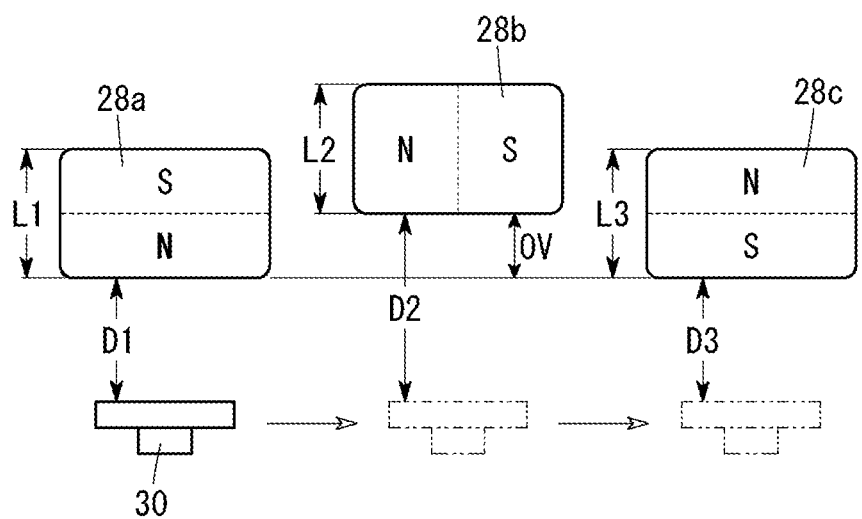
FIG. 4 is an explanatory diagram for explaining dimensions of the first to third magnets, and an offset amount.

Since in the plan view, the first to third magnets 28*a* to 28*c* are each shaped like a rectangle, the magnetic flux vector is easy to change even when the offset amount OV shown in FIG. 4 is small.

Figure 5:
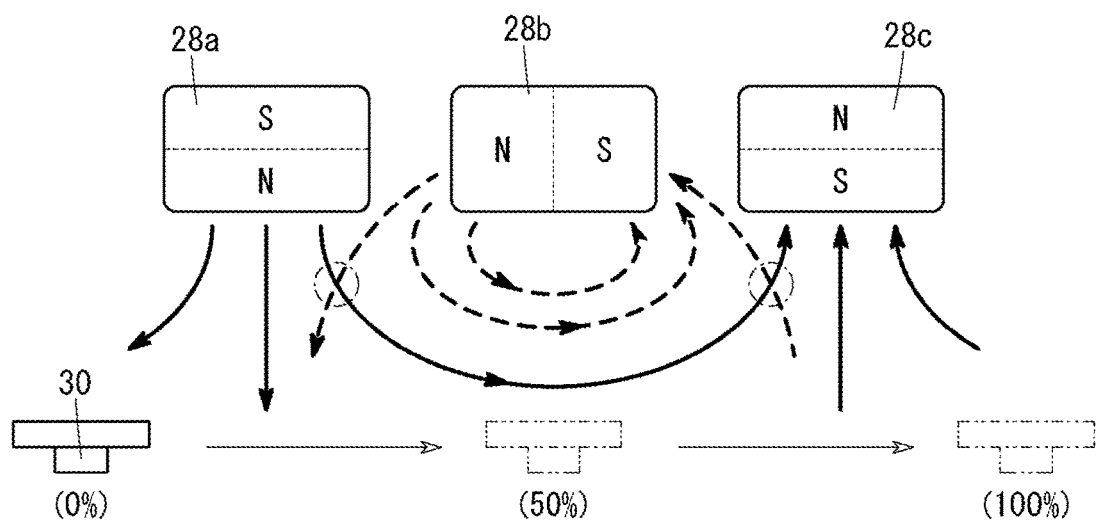
FIG. 5 is a plan view in the axial direction of the accelerator grip, which shows magnetic fluxes of the first to third magnets in a usual Halbach array.

Here, FIG. 5 shows magnetic fluxes produced by a usual Halbach array, which is formed from the first to third magnets 28*a* to 28*c*, with the second magnet 28*b* not offset from the first and third magnets 28*a*, 28*c*. In this case, too, a magnetic flux of the first magnet 28*a* is directed to the Hall element 30, while a magnetic flux of the second magnet 28*b* is directed to the first magnet 28*a*, as in the case shown in FIG. 3. In addition, the third magnet 28*c* receives a magnetic flux directed from the Hall element 30 to the third magnet 28*c*.

In this case, however, the vector of a magnetic flux directed from the second magnet 28*b* to the first magnet 28*a* intersects the vector of a magnetic flux directed from the first magnet 28*a* to the Hall element 30. Meanwhile, the vector of a magnetic flux directed from the north pole of the second magnet 28*b* to the south pole of the second magnet 28*b* intersects the vector of a magnetic flux directed from the Hall element 30 to the third magnet 28*c*. For these reasons, their magnetic forces slightly decrease.

Figure 6:
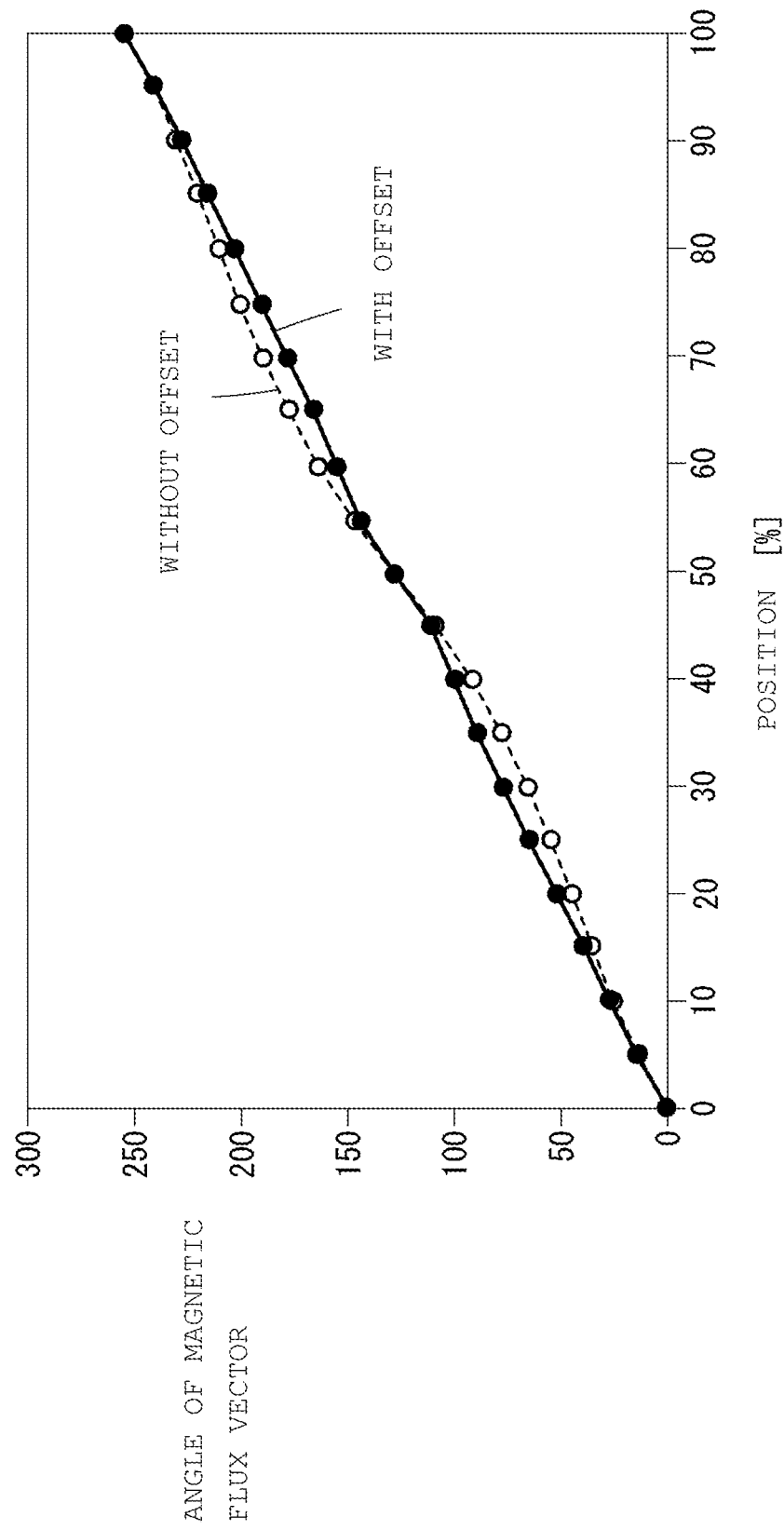
FIG. 6 is a graph showing a relationship between a position and a response characteristic of a magnetic sensor in each of the configurations shown in FIGS. 3 and 5; and, FIG. 7 is a graph showing deviations of each of the response characteristics shown in FIG. 6 from linearity.

FIG. 6 is a graph showing a relationship between a position and a response characteristic of the Hall element 30 in each of the case where the Halbach array is provided with the offset (see FIG. 3) and the case where the Halbach array is provided with no offset (see FIG. 5). It should be noted that: the horizontal axis represents the position (%) of the Hall element 30; and the vertical axis represents an angle of the magnetic flux vector detected by the Hall element 30. It is clear from FIG. 6 that: the response characteristic graph for the Halbach array provided with no offset includes a gentle convex downward and a gentle convex upward; and the response characteristic graph for the Halbach array provided with the offset shows near linearity.

Figure 7:
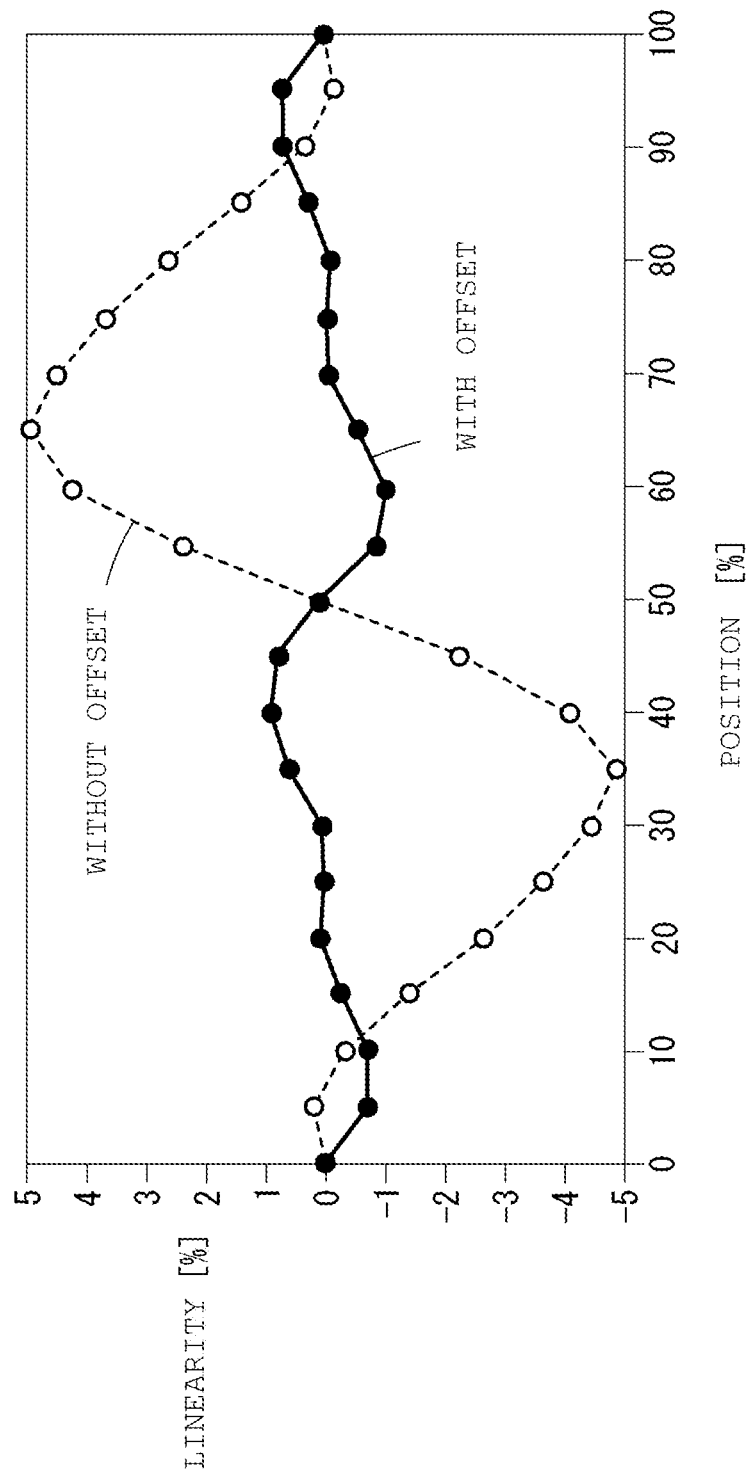

FIG. 7 is a graph showing how much each response characteristic shown in FIG. 6 is deviated from the linearity. From FIG. 7, it is also learned that the response linearity is better when the Halbach array is provided with the offset than when the Halbach array is provided with no offset.

According to the embodiment, as described above, the correlation between the distance of relative movement of the Hall element 30 and the angle of the magnetic flux vector can be approximated to a straight line. For this reason, the position of the accelerator grip 14 corresponds to the magnitude of the electric signal which the Hall element 30 sends based on the angle of the magnetic flux vector detected by the Hall element 30. Accordingly, the position of the accelerator grip 14, or how much the throttle opens, can be judged more precisely in the wide range.

As described above, the position detection apparatus 10 of the embodiment can increase freedom in the layout, and can achieve the reduction in the size of the rotor 16 in its radial direction. Furthermore, the position detection apparatus 10 is capable of assessing the throttle opening precisely.

Once the driver releases the hand from the accelerator grip 14, the stretched return spring 22 returns to the initial state due to its elasticity. Thereby, the rotor 16, the throttle pipe 34 and the accelerator grip 14 return to their initial positions. It is a matter of course that the first to third magnets 28*a* to 28*c* return to their initial positions.

The present invention is not limited particularly to the foregoing embodiment, and can be variously modified within the scope not departing from the gist of the present invention.

For example, the second magnet 28*b* may be offset in the radial direction of the rotor 16.

In addition, the number of magnets in the Halbach array is not limited particularly to three, and may be greater than three.

Furthermore, the second magnet 28*b* may be disposed such that the second magnet 28*b* is not offset from the third magnet 28*c*.

LIST OF THE REFERENCE NUMERALS

10 POSITION DETECTION APPARATUS
12 HANDLEBAR
14 ACCELERATOR GRIP
16 ROTOR
22 RETURN SPRING
24 HOUSING
28*a* FIRST MAGNET
28*b* SECOND MAGNET
28*c* THIRD MAGNET
30 HALL ELEMENT
32 FITTING RECESSED PORTION
34 THROTTLE PIPE
36 FITTING PROTRUSION

What is claimed is:

1. A position detection apparatus configured to judge a position of a movement body using a magnetic sensor for detecting a vector of a magnetic flux, wherein the movement body is provided with at least a first magnet, a second magnet and a third magnet, the first to third magnets with parallel pole axes are arranged in a Halbach array in which the north pole of the first magnet and the south pole of the third magnet face the magnetic sensor, the north pole of the second magnet faces the first magnet, and the south pole of the second magnet faces the third magnet, wherein a magnetic flux of the first magnet is directed to the magnetic sensor, a magnetic flux of the second magnet is directed to the first magnet, and the third magnet receives a magnetic flux directed from the magnetic sensor to the third magnet, a clearance distance between the second magnet and the magnetic sensor is set greater than a clearance distance between the first magnet and the magnetic sensor, and the first magnet, the second magnet and the third magnet are provided to the movement body such that a longitudinal direction of the Halbach array is along a direction of movement of the movement body, wherein the movement body is an accelerator grip turnably provided to a handle of a motorcycle, and the magnetic sensor is positioned and fixed to the handle, and in an initial position of the accelerator grip the magnetic sensor is located closer to the first magnet and rotation of the accelerator grip changes the positions of the first to third magnets relative to the magnetic sensor.

2. The position detection apparatus according to claim 1, wherein
the clearance distance between the first magnet and the magnetic sensor, and a clearance distance between the third magnet and the magnetic sensor are set equal to each other.

3. The position detection apparatus according to claim 2, wherein
a value obtained by subtracting the clearance distance between the first magnet and the magnetic sensor from the clearance distance between the second magnet and the magnetic sensor is equal to or greater than a third of a dimension of the first magnet in a magnetic pole direction thereof.

4. The position detection apparatus according to claim 3, wherein
the value obtained by subtracting the clearance distance between the first magnet and the magnetic sensor from the clearance distance between the second magnet and the magnetic sensor is equal to or less than a half of the dimension of the first magnet in the magnetic pole direction thereof.

5. The position detection apparatus according to claim 2, wherein
the first magnet, the second magnet and the third magnet are each shaped like a rectangle in a plan view.

6. The position detection apparatus according to claim 2, wherein the second magnet is farther from the magnetic sensor in an axial direction of the handle than the first magnet is.

7. The position detection apparatus according to claim 1, wherein
a value obtained by subtracting the clearance distance between the first magnet and the magnetic sensor from the clearance distance between the second magnet and the magnetic sensor is equal to or greater than a third of a dimension of the first magnet in a magnetic pole direction thereof.

8. The position detection apparatus according to claim 7, wherein
the value obtained by subtracting the clearance distance between the first magnet and the magnetic sensor from the clearance distance between the second magnet and the magnetic sensor is equal to or less than a half of the dimension of the first magnet in the magnetic pole direction thereof.

9. The position detection apparatus according to claim 8, wherein
the first magnet, the second magnet and the third magnet are each shaped like a rectangle in a plan view.

10. The position detection apparatus according to claim 8, wherein the second magnet is farther from the magnetic sensor in an axial direction of the handle than the first magnet is.

11. The position detection apparatus according to claim 7, wherein
the first magnet, the second magnet and the third magnet are each shaped like a rectangle in a plan view.

12. The position detection apparatus according to claim 7, wherein the second magnet is farther from the magnetic sensor in an axial direction of the handle than the first magnet is.

13. The position detection apparatus according to claim 1, wherein
the first magnet, the second magnet and the third magnet are each shaped like a rectangle in a plan view.

14. The position detection apparatus according to claim 13, wherein the second magnet is farther from the magnetic sensor in an axial direction of the handle than the first magnet is.

15. The position detection apparatus according to claim 1, wherein the second magnet is farther from the magnetic sensor in an axial direction of the handle than the first magnet is.

* * * * *